June 6, 1967    J. N. DUPREE ETAL    3,323,772
GRIPPING DEVICE
Filed July 2, 1965
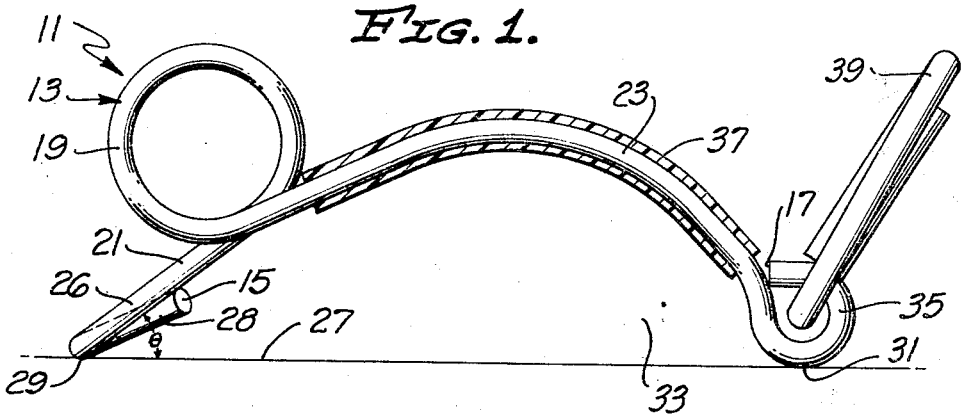
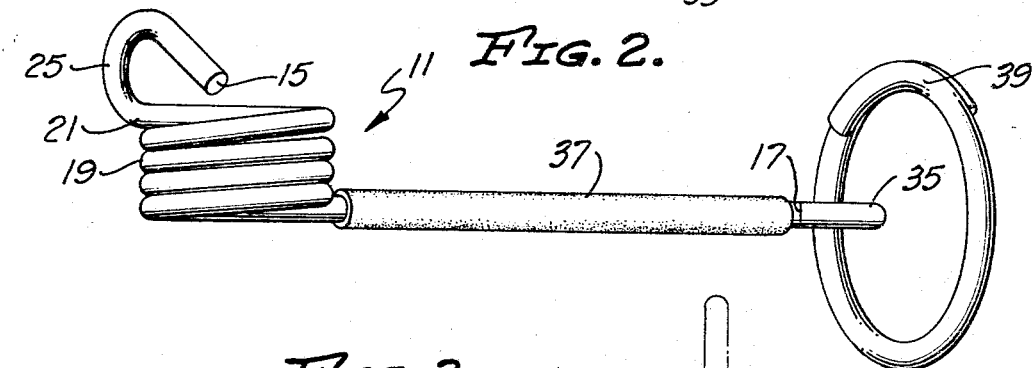
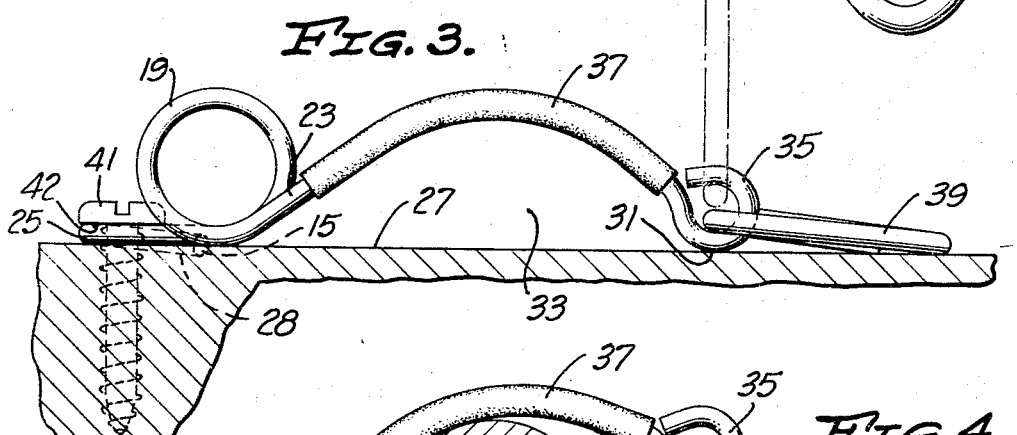
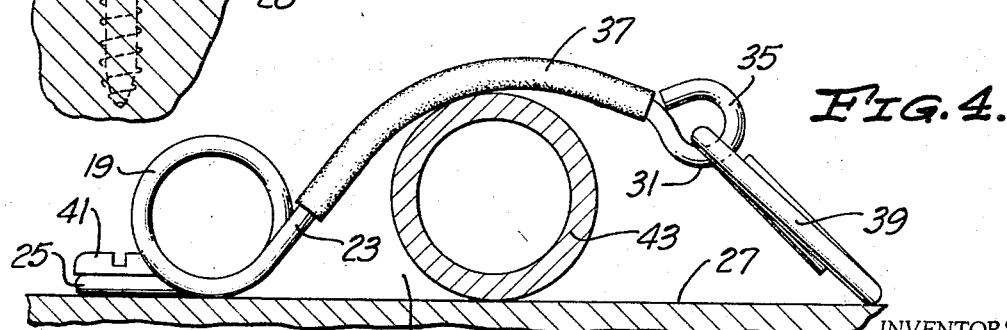
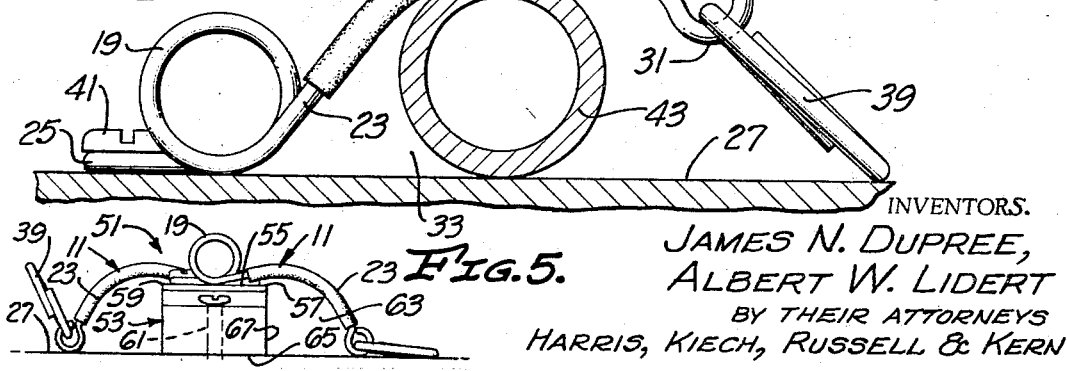
INVENTORS.
JAMES N. DUPREE,
ALBERT W. LIDERT
BY THEIR ATTORNEYS
HARRIS, KIECH, RUSSELL & KERN United States Patent Office 3,323,772
Patented June 6, 1967

3,323,772
GRIPPING DEVICE
James N. Dupree, 1710 Potrero Ave., South El Monte, Calif. 91733, and Albert W. Lidert, 1019 S. Magnolia, West Covina, Calif. 91790
Filed July 2, 1965, Ser. No. 469,238
2 Claims. (Cl. 248—361)

This invention relates to a gripping device and more particularly to a gripping device of the type which can be attached to a supporting surface and is useful in holding an object thereagainst. The gripping device of this invention has been found particularly useful in storing tools and sports equipment, e.g., fishing rods, out of the way.

An object of this invention is to provide a gripping device for attachment to a supporting surface to releasably secure an object thereto, the gripping device being formed from an integral resilient wire and including a gripping arm having a contact area which is spring-biased to engage and exert a substantial force on the supporting surface. The object is held between the gripping arm and the supporting surface. As the gripping arm is always biased toward the support, it is difficult to accidentally remove the object.

Another object is to provide a gripping device including a length of wire shaped to form a torsion spring intermediate its ends, the lengths of wire between the spring and the ends thereof forming a securing arm and a gripping arm, respectively, means on the securing arm for being secured to a supporting surface, and means responsive to the securing of the securing arm to the supporting surface to stress the torsion spring a predetermined amount to urge at least a portion of the gripping arm into tight engagement with the supporting surface. According to a particular object of this invention, the securing arm forms an eyelet the plane of which, prior to installation, intersects the supporting surface to form an acute angle. By use of a screw to secure such eyelet to the supporting surface, the size of the acute angle is reduced and a predetermined amount of torsion is applied to the spring to cause a portion of the gripping arm to be biased tightly against the supporting surface. Another object is to vary the amount of such pretorsion which is applied to the spring by adjusting the depth to which the screw is turned into the supporting surface.

A further object of this invention is to cover the gripping arm of a gripping device with a thin flexible cushioning sheath, the wall thickness of which is preferably substantially less than the diameter of the gripping arm. Such sheath serves to prevent marring or damage to the article retained by the gripping device. By keeping the diameter of the gripping arm-sheath composite structure as small as possible, larger articles may be held by the device.

Another object of this invention is to provide a gripping device having a gripping arm with a loop formed at the outer end thereof and a finger ring retained by such loop. The finger ring may be moved at least a limited amount in any direction with respect to the gripping arm and provides means for applying a force to the gripping arm to move the latter away from the supporting surface.

A further object of this invention is to provide a gripping device which is inexpensive, easy to manufacture, of simple construction, easily attached to a supporting surface whether vertical, horizontal or overhead, and permits quick removal of the article held thereby.

Another object of this invention is to provide a gripping device which will retain relatively large objects against a supporting surface. More particularly, it is an object of this invention to provide a gripping device in which the securing arm thereof is fastened to a block or body member which in turn may be attached to the supporting surface. The block spaces the securing arm from the supporting surface and allows the gripping arm to securely hold a larger object than would ordinarily be possible without the block. An additional advantage of this combination is that the block may be used as supporting ledges for supporting the tool while the wire portion of the gripping device clamps the tool against the supporting surface.

Still another object of this invention is to provide a gripping device having integral lock washer means. More particularly, it is an object of this invention to provide integral lock washer means for a gripping device, which means are formed by bending an end portion of the securing eyelet of the securing means downwardly or toward the supporting surface.

Thus, by using a screw in the securing eyelet to secure the gripping device to the supporting surface, such end of the securing arm is urged by the screw into the supporting surface. The end of the wire will be at least slightly embedded in the supporting surface a distance depending upon the relative hardnesses of the wire and the supporting surface. This has a lock washer effect in preloading the device and also prevents rotation of the gripping device while the screw is being turned into the supporting surface.

The invention, both as to its organization and method of operation, together with further objects and advantages thereof, may best be understood by reference to the following description taken in connection with the accompanying drawing, in which:

FIG. 1 is a side elevation partially in section of a gripping device in its normal or unstressed condition and resting on but unattached to a supporting surface;

FIG. 2 is a top plan view of the gripping device shown in FIG. 1;

FIG. 3 is a side elevation of the gripping device on a slightly reduced scale after it has been secured to the supporting surface;

FIG. 4 is a side elevation partially in section similar to FIG. 3 showing the gripping device attached to a supporting surface and holding an object thereagainst; and FIG. 5 is a reduced side elevational view of another embodiment of the gripping device.

Referring to FIGS. 1 and 2 of the drawing, a gripping device 11 includes an integral resilient metal wire 13 having ends 15 and 17 and forming a torsion coil spring 19 therebetween. The wire 13 is preferably fabricated from corrosion resistant spring steel and has a circular cross section of small diameter. As illustrated, it is preferred to utilize four turns in the coil spring 19; however, other numbers of turns may be used to vary the strength of the spring, if desired.

The length of the wire 13 between the spring 19 and the end 15 defines a securing arm 21 and the length of the wire between the spring and the end 17 defines a gripping arm 23. A portion of the securing arm 21 adjacent the end 15 is shaped to form an eyelet 25 as shown in FIG. 2. A portion 26 of the eyelet 25 intersects a generally flat supporting surface 27 to form an acute angle $\theta$, which, in the specific embodiment illustrated, is approximately 35°. An end portion or projection 28 of the securing arm 21 extends downwardly so as to be slightly lower than the portion 26. As shown in FIG. 1, when the spring 19 is in the unstressed condition, the securing arm 21 engages the supporting surface 27 at a contact area or contact surface 29.

As shown in FIG. 1, with the spring 19 in the unstressed condition, the spring is disposed adjacent and above the supporting surface 27. The gripping arm 23 extends outwardly from the lower portion of the spring and curves downwardly to engage the supporting surface 27 at a contact area or surface 31. The gripping arm 23 between the spring 19 and the contact area 31 is spaced upwardly from the supporting surface 27 to define an opening 33 therebetween and the wire 13 adjacent the end 17 is bent to form a loop 35.

More specifically, the gripping arm 23 extends upwardly from the lower portion of the spring 19 for approximately one-half of its length and then curves downwardly to engage the supporting surface 27. The securing arm 21 is of shorter length than the gripping arm 23 and extends outwardly from the spring 19 in a direction which is generally opposite to the direction in which the gripping arm extends. As shown in FIG. 2, the securing arm 21 and the gripping arm 23 extend outwardly from the spring 19 at opposite ends thereof. Preferably, the securing arm 21 does not curve substantially in the vertical plane shown in FIG. 1.

Substantially the full length of the gripping arm 23 between the spring 19 and the loop 35 is covered with a thin walled sheath 37 of resilient cushioning and protective material. The sheath 37, which is circular in cross section, protects the article which the gripping arm 23 holds to the supporting surface 27. The sheath 37 is preferably a flexible vinyl plastic material. By utilizing a very thin walled sheath 37 and fitting it snugly to the gripping arm 23, the size of the opening 33 is not significantly reduced, thereby allowing larger objects to be retained thereby than if a thicker walled sheath were used. The wall thickness of the sheath is preferably no greater than about .01 to .03 inch, such sheath being enlarged in the drawing for clarity, and in most cases will be no thicker than the diameter of the wire.

A separate finger ring 39 formed from a separate piece of wire is retained by the loop 35. It provides a convenient means for pulling the gripping arm 23 away from the supporting surface 27. The connection of the finger ring 39 to the loop 35 allows movement of the former with respect to the latter in all directions.

Installation or attachment of the gripping device 11 to the supporting surface 27 is quickly and easily accomplished by inserting a screw 41 having a flat lower surface 42 through the eyelet 25 and turning the screw into the supporting surface as shown in FIG. 3. An important feature of this invention is that in response to such turning of the screw 41, the spring 19 is subjected to stress or torsion, thereby winding up the spring. As the screw 41 is turned into the supporting surface 27, the acute angle θ (FIG. 1) is reduced and the contact area 31 moves to the right as viewed in FIG. 3. As the contact area 31 moves to the right, a different portion of the gripping arm 23 engages the surface 27, thereby effectively shifting the portion of the gripping arm which is considered as being the contact area 31. Similarly, as the acute angle θ is reduced, the contact area 29 on the securing arm 21 is enlarged. Simultaneously, with the tightening of the screw 41, the spring 19 and a portion of the gripping arm 23 move downwardly toward the supporting surface 27 to decrease the size of the opening 33. With the screw 41 turned all the way into the supporting surface 27 as shown in FIG. 3, a major portion of the securing arm 21 and the spring 19 will be in contact with the supporting surface or spaced upwardly only a very slight distance therefrom. In addition to securing the gripping device 11 to the supporting surface 27, the screw 41 torsions the spring 19 thereby causing the latter to urge the gripping arm 23 downwardly with substantial force. Accordingly, the contact area 31 applies a substantial force to the supporting surface 27. Thus, any object retained by the gripping arm 23 is held against the supporting surface 27 by at least this amount of pretorque.

Another important feature of this invention is that the amount of pretorque can be varied to accommodate the requirements of various users by simply adjusting the depth to which the screw 41 is turned into the supporting surface 27. Thus, by unscrewing the screw 41 from the position shown in FIG. 3, the angle θ assumes a value greater than zero and the amount of pretorque is reduced.

Still another important feature of this invention is the end portion 28 which functions like a lock washer in placing an upward load on the screw 41. The end portion 28 is also embedded slightly in the supporting surface 27 by the screw 41 to thereby prevent rotation of the gripping device 11 as the screw 41 is turned into the supporting surface.

FIG. 4 illustrates the gripping device 11 being utilized to retain an object of relatively large diameter. By utilizing the finger ring 39, the gripping arm 23 may be pulled away from the supporting surface 27, i.e., rotated counterclockwise as viewed in FIG. 4, to enlarge the space 33 to allow insertion of an object 43 therein. Such pulling of the gripping arm 23 stresses the spring 19 beyond the amount of initial torque or pretorque and releasing thereof allows the spring to urge the gripping arm back toward the supporting surface to hold the object 43 securely thereagainst. Thus, the object 43 will always be held firmly against the supporting surface 27 by at least the amount of pretorque. When the object 43 is relatively large, it is held against the supporting surface by more force than is represented by the amount of pretorque; however, smaller objects will always be retained by at least the pretorque, thereby substantially reducing the possibility of accidental removal thereof.

If the wall of the sheath 37 were quite thick, the gripping arm 23 would have to be pivoted counterclockwise a greater amount in order to enlarge the opening 33 a sufficient amount to receive the object 43. In this situation, the gripping arm 23 might have to be pivoted counterclockwise so far that it could not prevent the object 43 from being forced through the space between the contact area 31 and the supporting surface 27 under the biasing force of the spring 19.

Of course, the object 43 may be released by merely pulling on the finger ring 39 to pivot the gripping arm 23 counterclockwise. Although the gripping arm 23 and the securing arm 21 are shown as extending in substantially opposite directions, it should be understood that other orientations of these arms are possible so long as the orientation selected allows for the pretorquing of the spring 19.

FIG. 5 shows another embodiment of this invention. A gripping device 51 includes a block or body member 53 having an upper surface 55 at least partially bounded by opposed edges 57 and 59. The block 53 may be of various sizes and shapes but is preferably a generally rectangular solid piece and constructed of wood with a finished outer surface. The block 53 may be attached to the supporting surface 27 by a plurality of screws 61 (one being shown).

Secured to the upper surface 55 of the block 53 are two of the gripping devices 11 which are identical to the gripping device illustrated in FIGS. 1 through 4. Although any number of the gripping devices 11 may be secured to the block 53, it is preferred to use only one of the gripping devices 11. The gripping arm 23 extends outwardly from the spring 19 over the edge 57 and downwardly to engage the supporting surface 27. A relatively large space 63 is defined by the supporting surface 27, the block 53, and the gripping arm 23.

The block 53 is preferably of such a size relative to the gripping device 11 that in securing the block to the supporting surface 27, the spring 19 will be torsioned slightly. Thus, although the block 53 has a generally flat lower surface 65, such flat surface would form a relatively small acute angle with the supporting surface 27 when the block 53 is not secured thereto. The gripping devices 11 include the downwardly extending end portion 28.

The gripping device 51 may be secured to a generally horizontal flat supporting surface 27 as shown in FIG. 5 or to a supporting surface having any desired orientation. When secured to the surface 27, the surface 55 is spaced from the supporting surface and a side 67 of the block provides a surface against which the object may be held. When the supporting surface 27 is vertical, the side 67 is horizontal and provides a ledge on which the object may rest.

Many changes, modifications, and substitutions may be made by those having ordinary skill in the art without necessarily departing from the spirit and scope of this invention.

What is claimed is:

1. A gripping device for securing an object to a generally flat supporting surface and attachable to the supporting surface by a screw comprising:

an integral resilient wire having first and second ends and forming a torsion coil spring therebetween, the length of said wire between said spring and said first end defining a securing arm and the length of said wire between said spring and said second end defining a gripping arm, said spring being positionable adjacent and above said supporting surface, said gripping arm extending outwardly from said spring and curving downwardly to engage the supporting surface at a first contact area of said gripping arm, said gripping arm between said spring and said first contact area being spaced upwardly from the supporting surface to define an opening therebetween, said securing arm extending outwardly from said spring and in a direction which is generally opposite to the direction in which said gripping arm extends, a portion of said wire adjacent said first end being shaped to form an eyelet for receiving the screw, said eyelet having a second contact area engageable with the supporting surface, at least a portion of said eyelet intersecting the support surface to form an acute angle when said first and second contact areas are engaging the supporting surface, insertion of the screw through said eyelet and the turning thereof into the supporting surface causing said acute angle to be reduced in size and biasing said first contact area of said gripping arm tightly against said supporting surface thereby applying a predetermined amount of torsion to said spring, said wire adjacent said second end forming a loop; and a finger ring retained by said loop for pulling said gripping arm and said first contact area away from the supporting surface to allow insertion of the object between said gripping arm and the supporting surface, such movement of the gripping arm applying additional torsion to said spring, said gripping arm moving toward said supporting surface under the force of said spring when said finger ring is released, said gripping arm holding said object securely against the supporting surface by at least said predetermined amount of torsion of said spring.

2. A gripping device as defined in claim 1 wherein said first end of said wire forms a projection extendible toward said supporting surface and wherein said turning of said screw forces said projection slightly into said supporting surface to prevent angular rotation of the device with the turning of said screw.

References Cited

UNITED STATES PATENTS

| 164,657 | 6/1875 | Pack et al. | 24—66 |
| 256,169 | 4/1882 | Sherman | 151—37 |
| 361,153 | 4/1887 | Finks | 24—257 |
| 458,074 | 8/1891 | Shaw | 248—443 |
| 731,747 | 6/1903 | Bjornstad | 24—261 |
| 968,641 | 8/1910 | Bomborn | 24—66 |
| 1,520,032 | 12/1924 | McCulloch | 151—36 |
| 1,542,362 | 6/1925 | Blakely | 248—361 |

FOREIGN PATENTS

| 59,767 | 8/1938 | Norway. |

JOHN PETO, *Primary Examiner.*

CLAUDE A. LEROY, *Examiner.*

R. P. SEITTER, *Assistant Examiner.*